Nov. 11, 1952 W. A. FINK ET AL 2,617,451
BLADE TENSIONING MEANS FOR MEAT-CUTTING BAND SAWS
Filed Aug. 23, 1947 10 Sheets-Sheet 1
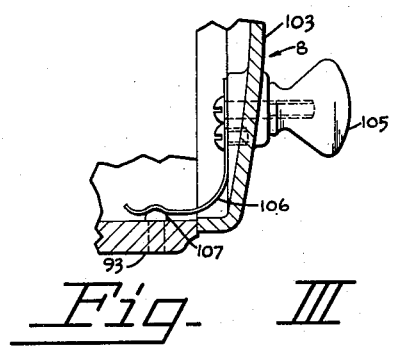
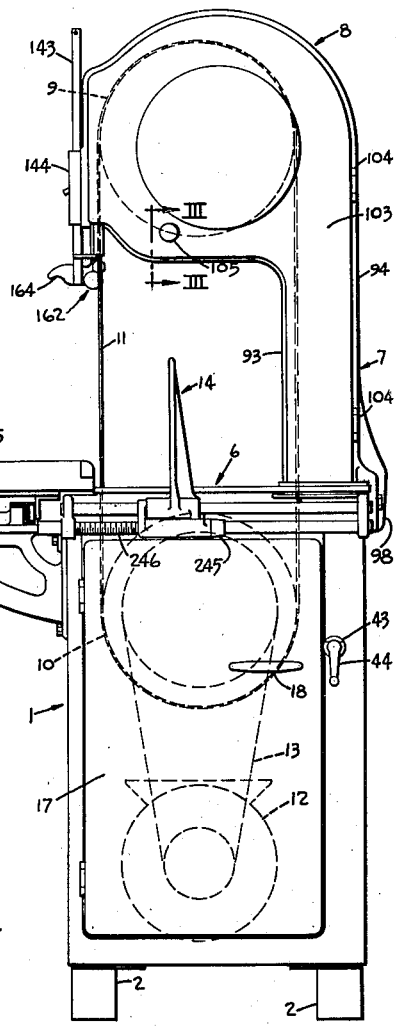
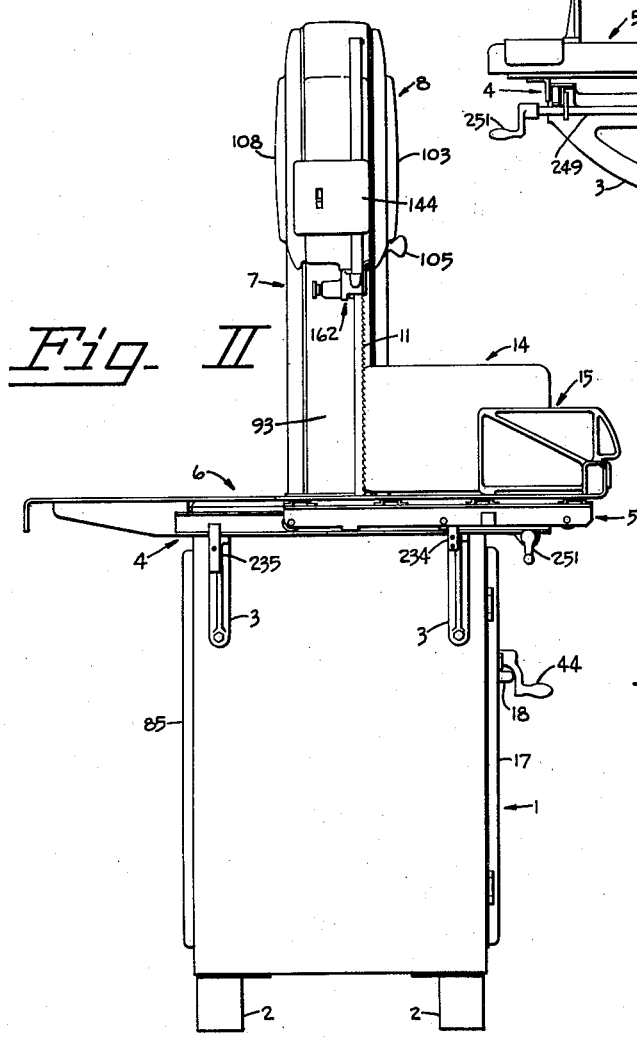
INVENTORS
Walter A. Fink
James D. Brown
BY Marshall and Marshall
ATTORNEYS Nov. 11, 1952 W. A. FINK ET AL 2,617,451
BLADE TENSIONING MEANS FOR MEAT-CUTTING BAND SAWS
Filed Aug. 23, 1947 10 Sheets-Sheet 2
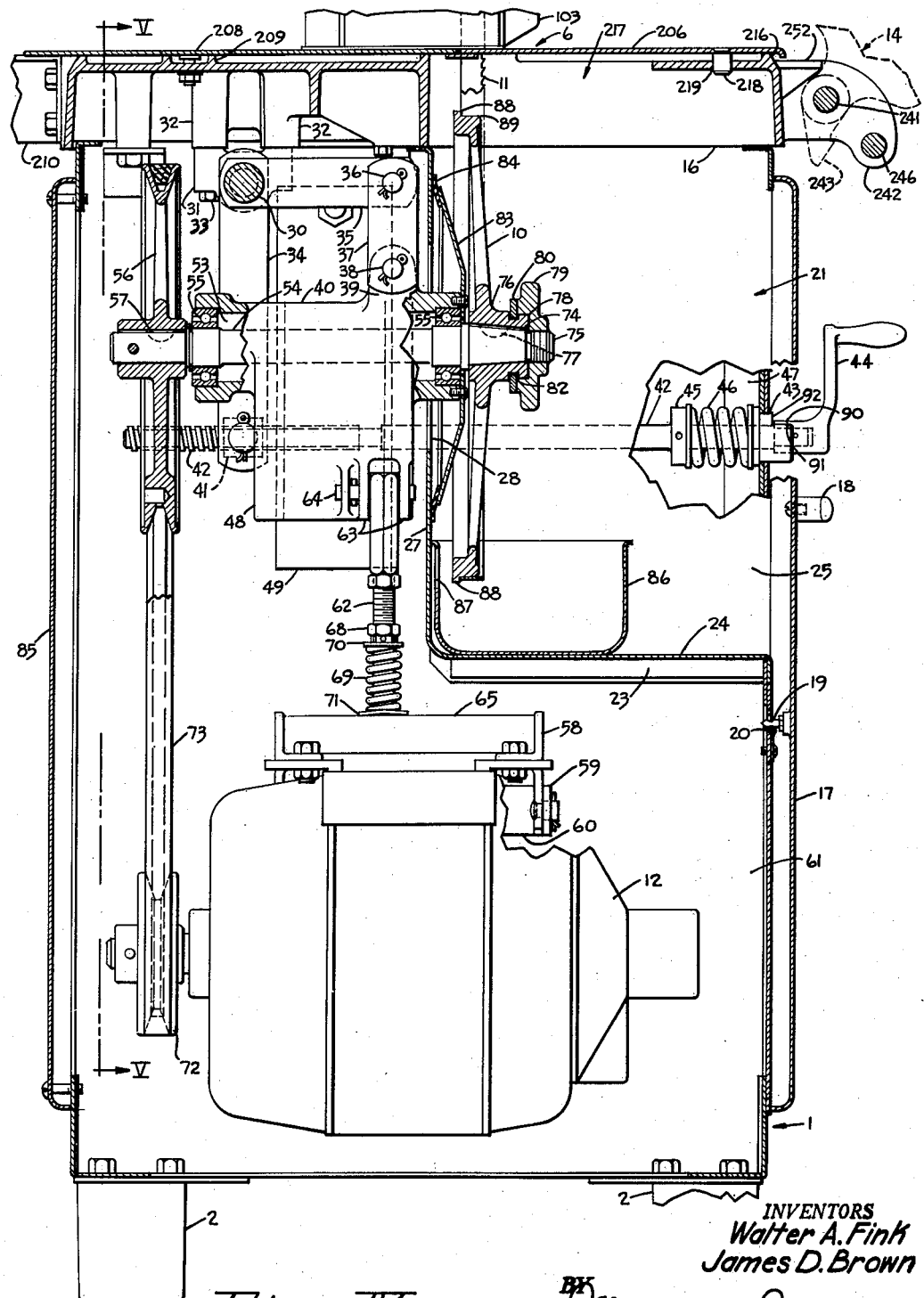
Fig. IV
INVENTORS
Walter A. Fink
James D. Brown
BY Marshall and Marshall
ATTORNEYS

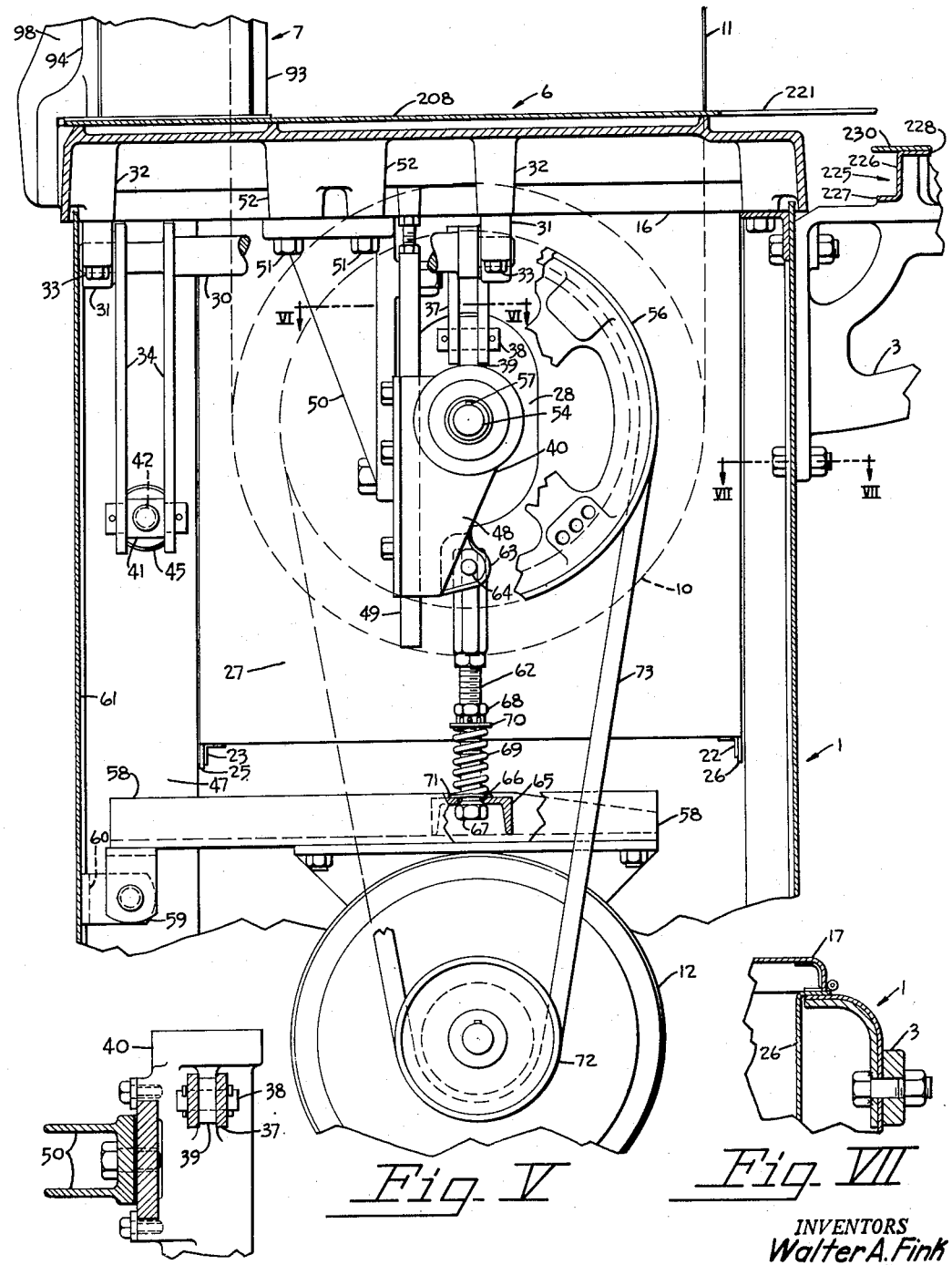

Nov. 11, 1952 W. A. FINK ET AL 2,617,451
BLADE TENSIONING MEANS FOR MEAT-CUTTING BAND SAWS
Filed Aug. 23, 1947 10 Sheets-Sheet 4
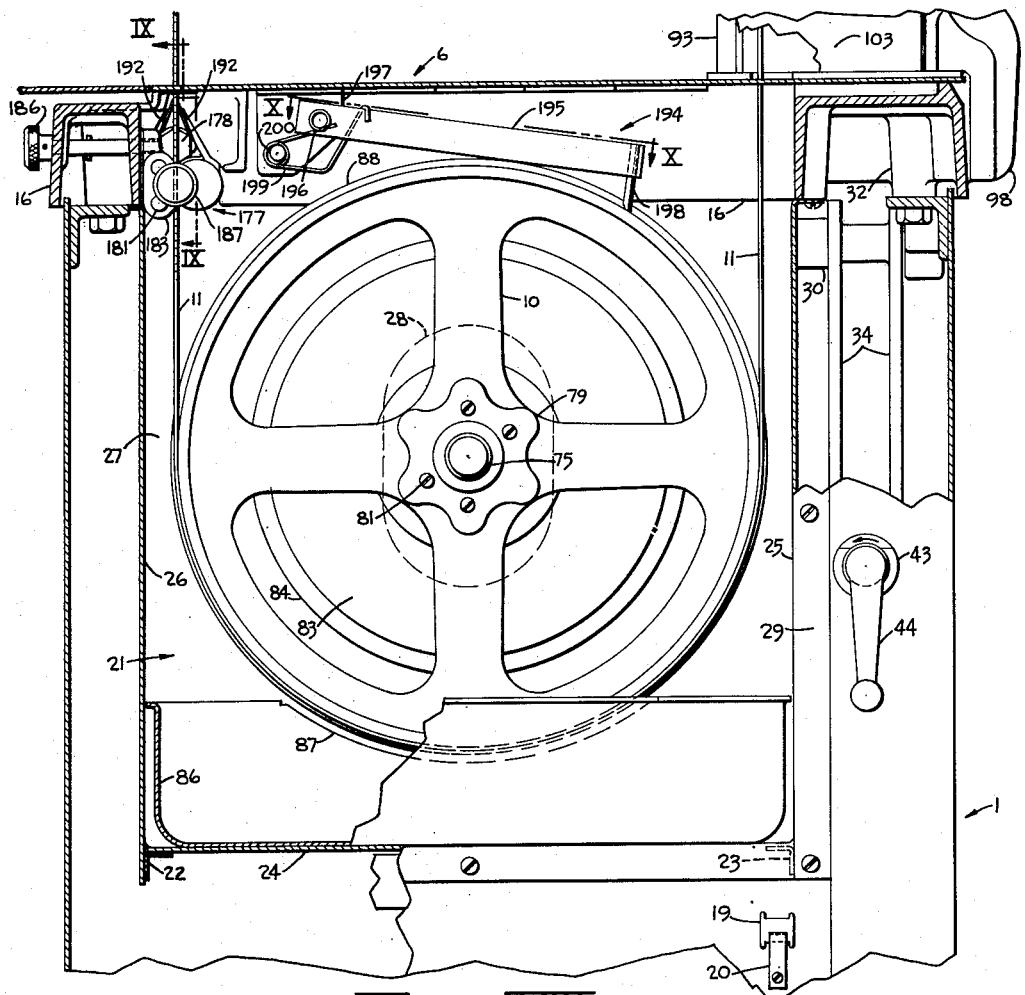
Fig. VIII
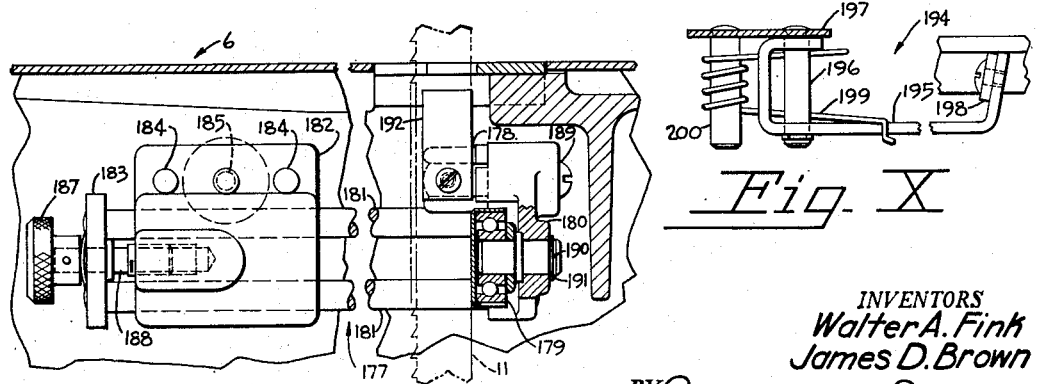
Fig. IX  Fig. X
INVENTORS
*Walter A. Fink*
*James D. Brown*
BY *Marshall and Marshall*
ATTORNEYS

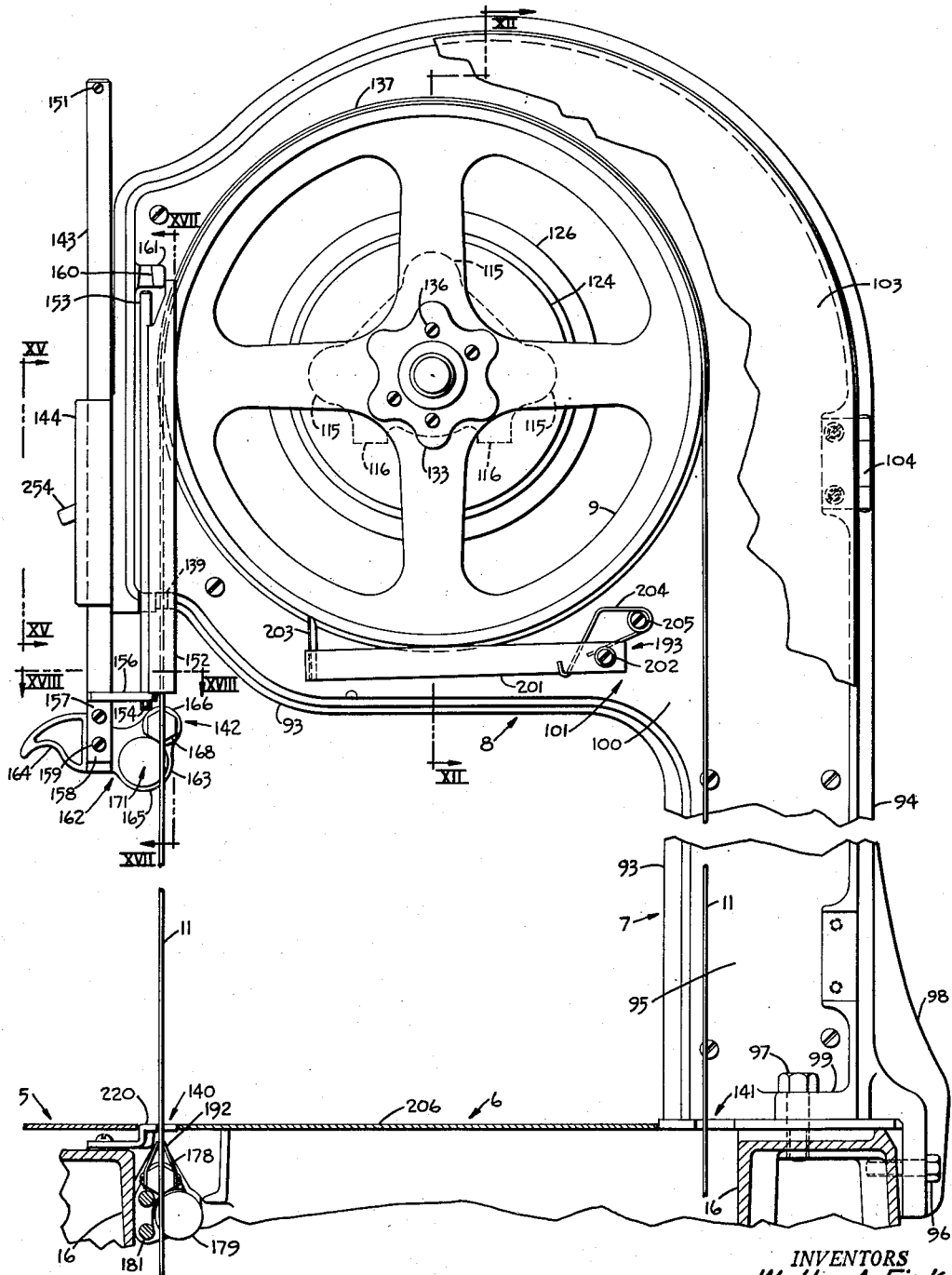

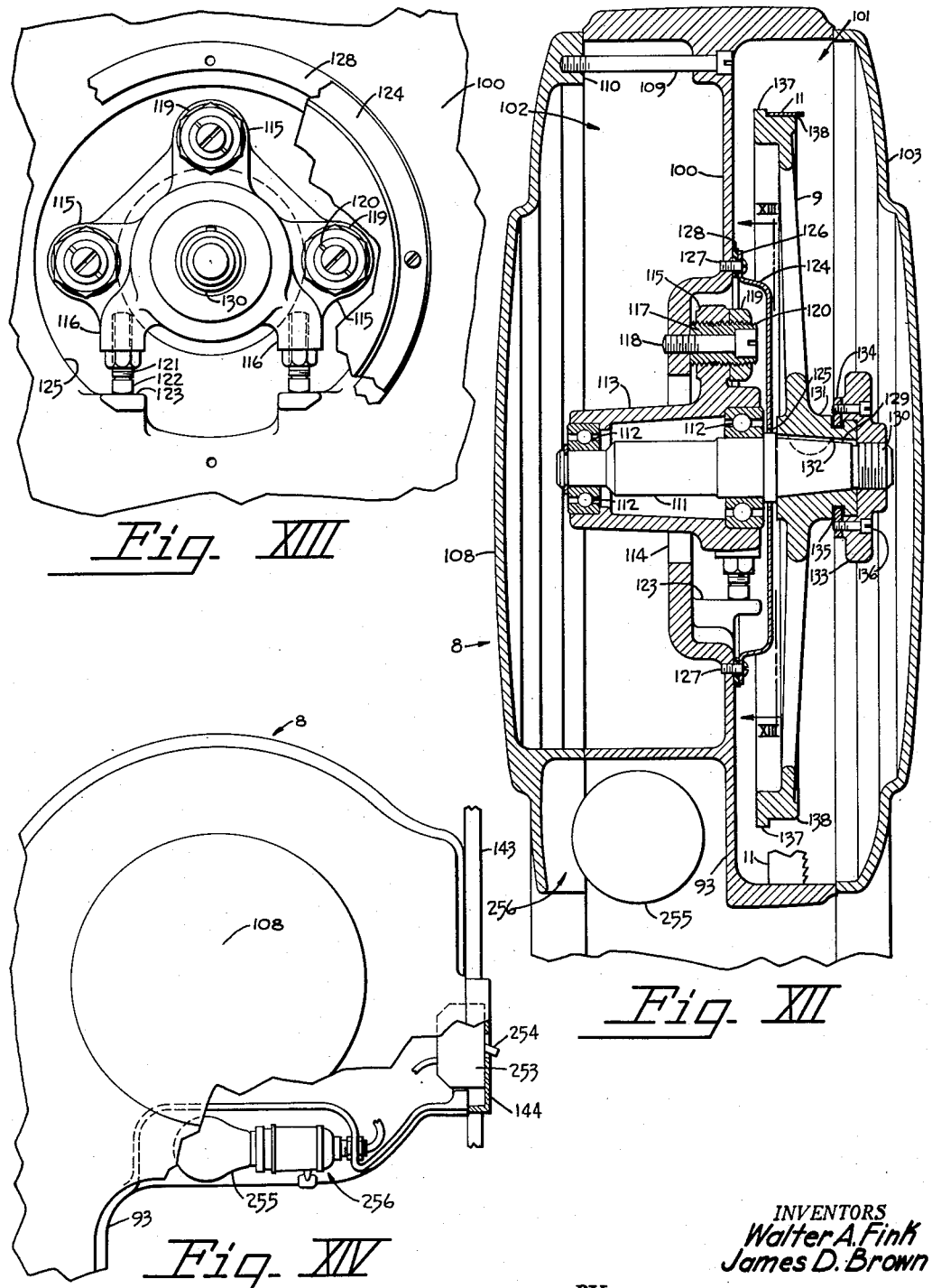

Nov. 11, 1952  W. A. FINK ET AL  2,617,451
BLADE TENSIONING MEANS FOR MEAT-CUTTING BAND SAWS
Filed Aug. 23, 1947  10 Sheets-Sheet 7
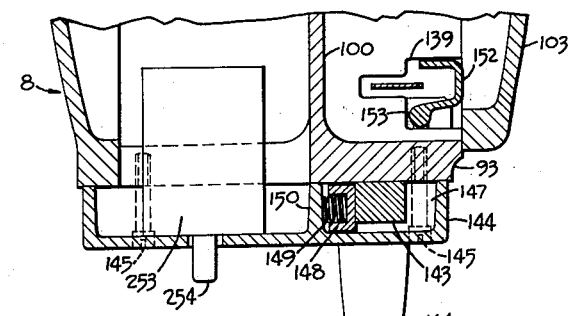
Fig. XVI
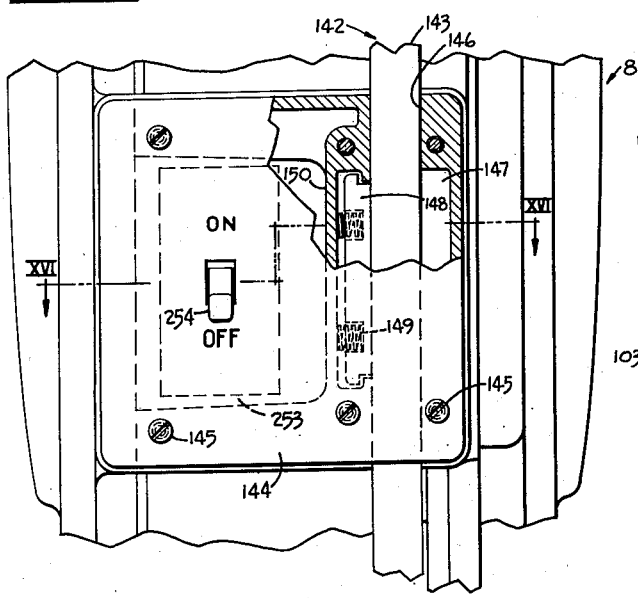
Fig. XV
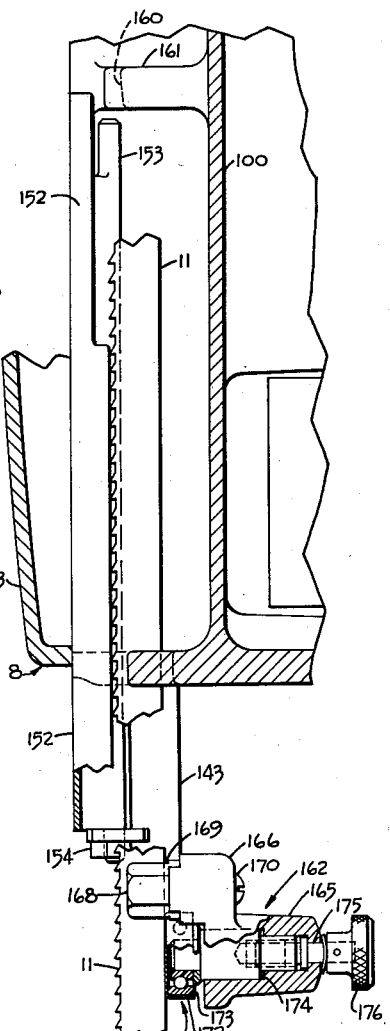
Fig. XVII
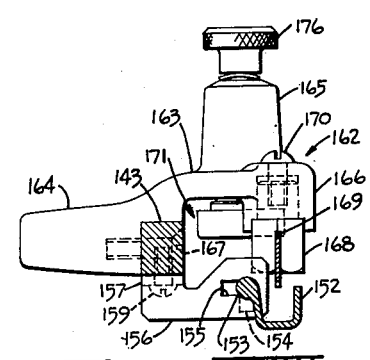
Fig. XVIII
INVENTORS
Walter A. Fink
James D. Brown
BY Marshall and Marshall
ATTORNEYS

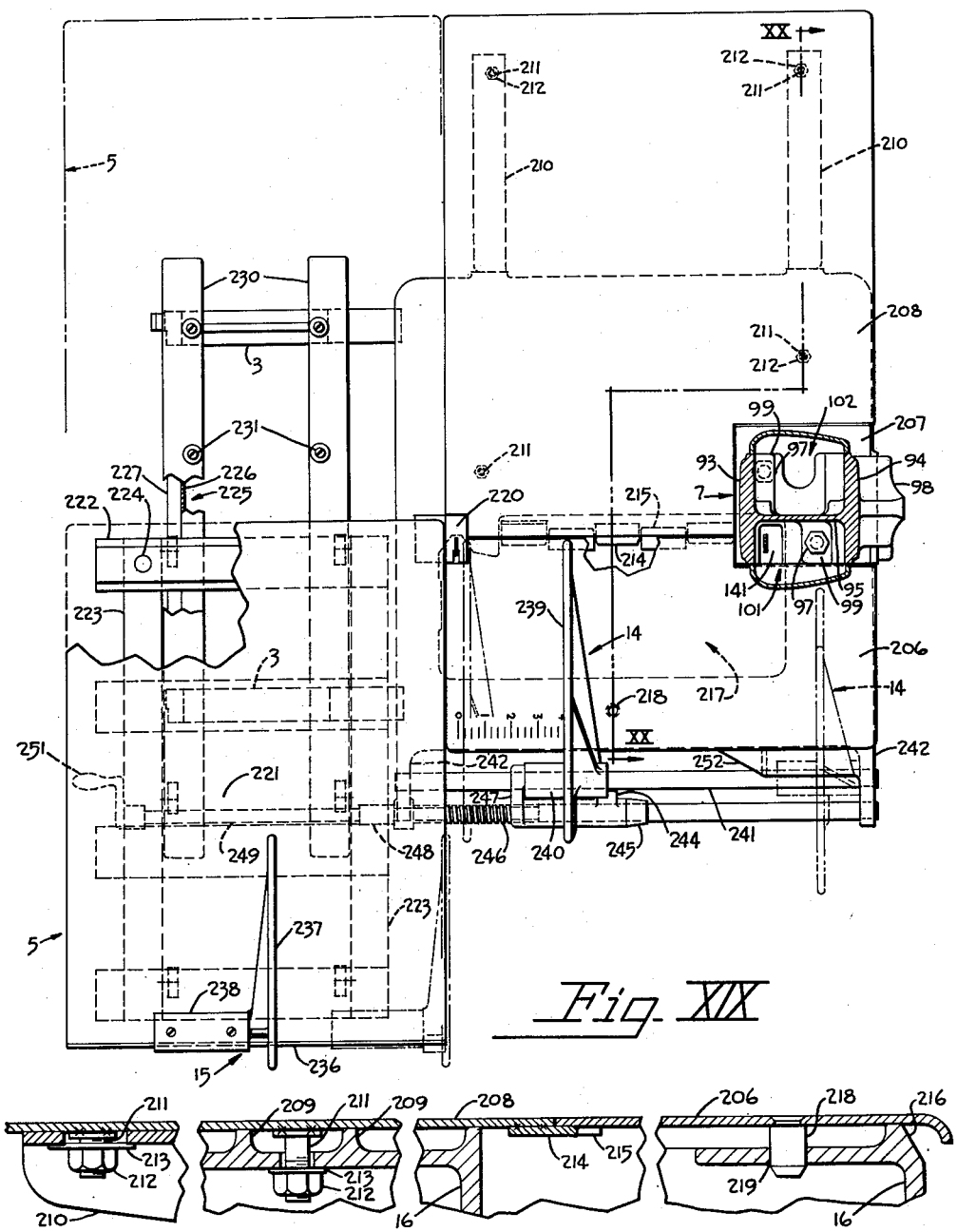

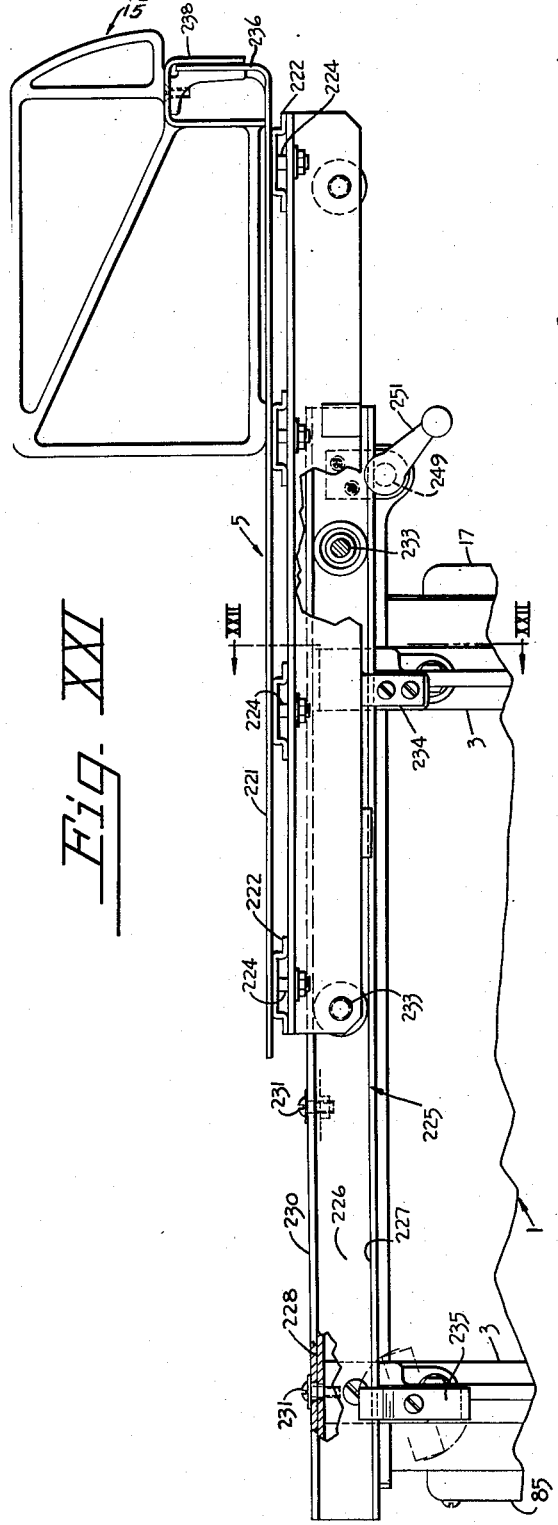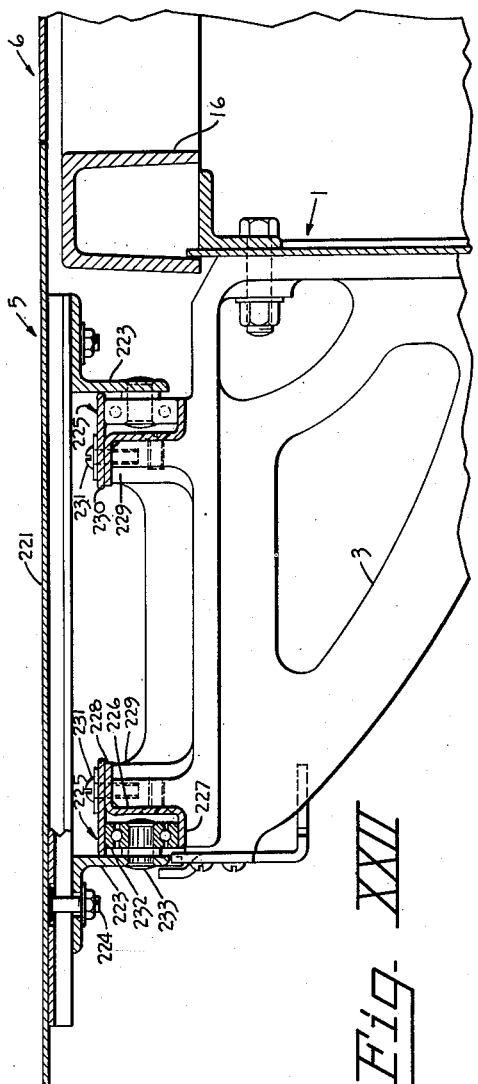

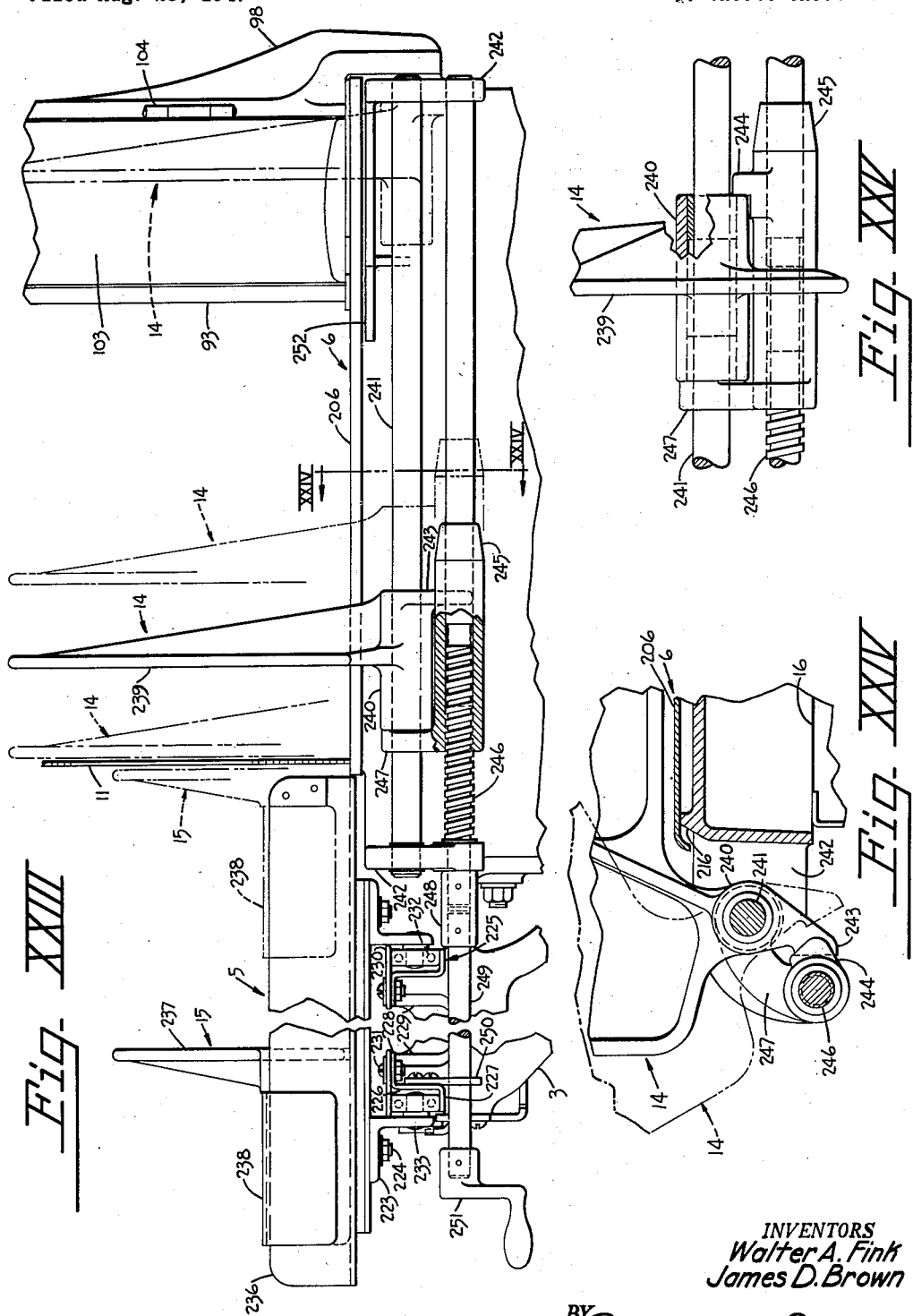

Patented Nov. 11, 1952

2,617,451

UNITED STATES PATENT OFFICE 2,617,451

BLADE TENSIONING MEANS FOR MEAT-CUTTING BAND SAWS

Walter A. Fink and James D. Brown, Toledo, Ohio, assignors to Toledo Scale Company, Toledo, Ohio, a corporation of New Jersey Application August 23, 1947, Serial No. 770,247

4 Claims. (Cl. 143—27)

This invention relates to meat cutting saws of the type employed in meat retailers' and wholesalers' establishments, in hotels and restaurants, and in other places where large quantites of meat must be cut up from carcass, half carcass, or quarter carcass pieces to prepare steaks, chops, roasts and other saleable or preparable pieces of meat.

The principal advantage accruing from the use of a meat cutting band saw lies in the great speed with which large pieces of meat can be cut into smaller, more usable pieces. Saws of this type are equipped with blades which are designed to cut meat, gristle, fat, bone and sinew with equal speed. Therefore, an operator using a machine can make severing cuts at high speed regardless of the nature of the particular substance through which the cut must be made. In general, many machines of this type have been designed but in each of the machines there has been at least one or more clumsy or less than desirable features.

It is the object of this invention to provide a meat cutting band saw specifically designed for the purpose for which it is intended and so organized and equipped as to facilitate the handling of large pieces of meat and their rapid and easy preparation for use.

It is another object of this invention to provide a meat cutting band saw which can be cleaned quickly and easily to maintain it in sanitary condition.

It is another object of this invention to provide a meat cutting band saw having quickly removable saw wheels, thus facilitating cleaning the peripheries thereof to keep the machine sanitary.

It is still another object of this invention to provide a meat cutting band saw equipped with means for cleaning, guiding and supporting the blade during operation which can be removed and replaced as a unit to simplify the maintenance of these parts in sanitary condition.

It is yet another object of this invention to provide a meat cutting band saw in which the cut-thickness gauge plate can be placed a desired distance from the saw blade, as for the cutting of a steak of certain thickness, can be moved out of the way for major portion cutting and returned directly to the exact setting at which it was located before moving.

A still further object of this invention is to provide a meat cutting band saw with easily accessible simplified control means for adjusting the tension of the band saw blade itself.

Yet another object of this invention is the provision of saw blade tensioning means which do not require great manual exertion to affect the tensioning of the blade.

A still further object of this invention is the provision of a work light so mounted in a meat cutting band saw as to cast light directly upon the working area of the machine and upon the swiftly moving saw blade itself, thereby to brightly illuminate this most dangerous portion of the machine and assist in preventing accidents.

A still further object of this invention is to provide a meat cutting band saw in which all of the running parts of the machine are easily accessible for cleaning, for oiling and for general maintenance and repair.

Many more specific objects and advantages will be apparent from the particular construction, assembly and association of parts which constitute a meat cutting band saw constructed in accordance with this invention.

These details are illustrated in the drawings in which:

Figure I is an end elevation of a meat cutting band saw embodying the invention.

Figure II is a front elevation of the machine illustrated in Figure I.

Figure III is a greatly enlarged fragmentary detail view taken on the line III—III in Figure I.

Figure IV is a greatly enlarged vertical sectional view with certain parts broken away and showing the general construction of the base and the driving means of the machine illustrated in Figure I.

Figure V is a fragmentary vertical sectional view taken substantially from the position indicated by the line V—V in Figure IV.

Figure VI is a fragmentary detailed sectional view on a further enlarged scale and taken substantially from the position indicated by the line VI—VI in Figure V.

Figure VII is a fragmentary detailed sectional view taken substantially from the position indicated by the line VII—VII in Figure V.

Figure VIII is a fragmentary transverse sectional view taken from the right side of Figure IV and with certain parts broken away.

Figure IX is a fragmentary enlarged vertical sectional view taken substantially on the line IX—IX in Figure VIII.

Figure X is a fragmentary detailed view taken substantially from the position shown by the line X—X in Figure VIII.

Figure XI is a greatly enlarged fragmentary view partly in elevation and partly in section showing the details of the construction of the head of the machine illustrated in Figure I.

Figure XII is a fragmentary vertical sectional view taken substantially on the line XII—XII in Figure XI.

Figure XIII is a fragmentary detailed view taken substantially from the position indicated by the line XIII—XIII in Figure XII, with the upper saw wheel removed.

Figure XIV is a fragmentary view in elevation and on a smaller scale showing the side of the head opposite from that shown in Figure XI.

Figure XV is a fragmentary view in elevation and on an enlarged scale with certain parts broken away taken substantially from the position indicated by the line XV—XV in Figure XI.

Figure XVI is a fragmentary horizontal sectional view taken substantially on the line XVI—XVI in Figure XV.

Figure XVII is a fragmentary vertical sectional view taken substantially on the line XVII—XVII in Figure XI.

Figure XVIII is a detailed horizontal sectional view taken substantially on the line XVIII—XVIII in Figure XI.

Figure XIX is a plan view of the working table with certain parts broken away and other parts indicated by dotted lines to show their construction and operation.

Figure XX is a fragmentary vertical sectional view taken substantially on the line XX—XX in Figure XIX and illustrating the construction and mounting of the working table.

Figure XXI is a fragmentary front elevation of the working table and supporting structure illustrating general details of construction.

Figure XXII is a fragmentary vertical sectional view on an enlarged scale taken substantially on the line XXII—XXII in Figure XXI.

Figure XXIII is a greatly enlarged fragmentary view partly in section illustrating the construction and operation of the thickness gauge plate and taken from the right side of Figure II.

Figure XXIV is a fragmentary vertical sectional view taken substantially on the line XXIV—XXIV in Figure XXIII.

Figure XXV is a fragmentary view showing details of the gauge plate mechanism.

The meat cutting band saw generally illustrated in Figures I and II has a base housing 1 which is erected on four short closed legs 2 and to which is attached, by means of forwardly extending brackets 3, a runway 4 on which a movable table 5 is mounted to reciprocate. The top of the housing 1 is formed by a stationary table 6 which lies on the same plane as the moving table 5 forming with the moving table a working surface for handling the meat to be cut on the machine.

At the rear center portion of the housing 1 there is erected a column 7 atop which is located a head 8. An upper saw wheel 9 is journaled in the head 8 and a lower saw wheel 10 is journaled within the base 1. A continuous band saw blade 11 runs on the two saw wheels 9 and 10 passing upwardly through the hollow column 7 and downwardly across the throat formed between the underside of the head 8 and the table 6. A driving motor 12 is mounted in the base housing 1 and drivingly connected to the lower saw wheel 10 by a drive belt 13.

A thickness gauge plate 14 is mounted for fore and aft movement along the right-hand side of the table 6 back of the cutting plane of the blade 11 so that by setting the position of the gauge plate 14 relative to the blade 11 slices of meat of desired thickness can be cut. A pusher plate 15 is slidable across one end of the table 5 to push and hold smaller pieces of meat against the thickness gauge plate 14 when the table is moved to cut the meat.

*Base housing*

The base housing of the machine which is illustrated in detail in Figures IV through X is constructed of sheet metal bent and welded into a rectilinear hollow body around an angle iron framework and carrying on its upper end a main table casting 16. The right side of the base housing 1 is closed by an access door 17 which is hinged at its forward edge and is provided with a handle 18 by which it can be opened. The door 17 is held in latched position when closed by the engagement of a bullet-head pin 19 (Figure IV) with a small formed clip 20 attached to an interior cross member of the housing frame. Opening the door 17 gives access to the interior of the base housing 1 which is compartmented. At the upper right-hand portion of the base housing there is located a wheel compartment 21 (Figures IV and VIII) formed of sheet metal secured to angle brackets 22 and 23 and which has a flat closed bottom 24, closed back and front walls 25 and 26 and an inside wall 27 in which is cut a vertically elongated opening 28. The sheet metal forming the walls and bottom of the wheel compartment 21 is secured to the underside of the main casting 16 and also provided with turned-over lips 29 which form the edges of the open side of the compartment.

The remainder of the interior of the base housing constitutes a single compartment containing the driving motor 12, its mounting means and the means for mounting and adjustably positioning the lower saw wheel 10. The entire structure consisting of the parts just enumerated is supported from the underside of the main casting 16 by means of a shaft 30 which is rockingly mounted by a pair of clamps 31 which are mounted on the lower ends of bosses 32 formed on the casting 16 by means of studs 33. The shaft 30 extends horizontally along beneath the casting 16 from the approximate midpoint of the base housing 1 to the rear of the base housing 1. A pair of rocker arms 34 and 35 are securely welded to the shaft 30, one near each of its ends, the rocker arm 34 being located at the rear and extending downwardly and the rocker arm 35 being located at the forward end and extending forwardly toward the right (from the front of the machine—Figure IV). The end of the rocker arm 35 is pivotally connected by a pin 36 (Figure IV) to the upper end of a downwardly extending double link 37, the lower end of which is pivotally connected by a pin 38 to a drilled ear 39 formed on the upper side of a lower wheel journal casting 40.

The lower end of the rocker arm 34 pivotally mounts a square nut 41 which is threaded on the left end of a tension control rod 42, the right end of which extends along behind the back wall 25 of the wheel compartment 21 and through a bushing 43 outside of the base housing 1 having a hand crank 44 pinned on its outermost end. A collar 45 (Figure IV) is pinned to the rod 42 a short distance inside the wall of the housing 1 and a heavy coil spring 46 surrounds the rod 42 being compressible between the collar 45 and the inner end of the bushing 43. The rod 42 is so close to the rear of the base housing 1 that the bushing 43 supporting its outermost (right) end is mounted not only in the wall of the base housing 1 but also, in order to provide added rigidity, in one flange of an upright corner bracket 47 forming one of the main vertical structural members of the base housing 1.

The journal casting 40 has a downwardly extending flanged portion 48 which is slidingly mounted on a vertical plate 49 secured to an angle bracket 50 attached in turn by studs 51 to the underside of bosses 52 formed on the main casting 16. The plate 49 serves as a guide for vertical movement of the journal casting 40. The journal casting 40 has a horizontal bore 53 through which there extends a lower wheel axle 54, the axle 54 being journaled in the casting 40 by a pair of ball bearings 55 one of which is located at each end of the bore 53. The left end (Figure IV) of the axle 54 mounts a V-belt pulley 56 which is keyed thereto by a Woodruff key 57 and the right end of the axle 54 removably mounts the lower saw wheel 10. The driving motor 12 is mounted on the underside of a hinged bracket 58 formed of heavy angle irons which is pivoted at its rear end to ears 59 formed at the end of a bar 60 welded to the interior of a rear wall 61 of the base housing 1. The motor bracket 58 is supported from the journal housing 40 by means of a rod 62 the upper end of which extends between a pair of ears 63 formed on the portion 48 of the journal casting 40 and which is attached thereto by a support pin 64. The lower end of the rod 62 extends through a cross channel 65 of the motor bracket 58, loosely fitting in a hole 66 bored in the cross channel 65, and having a head 67 of larger diameter than the hole 66. The lower portion of the rod 62 is threaded and a castellated nut 68 located thereon. The nut 68 can be tightened downwardly to compress a coil spring 69 which surrounds the lower end of the rod 62 acting between a washer 70 beneath the nut 68 and a washer 71 above the cross channel 65. A drive pulley 72 is mounted on the end of the shaft of the motor 12 and a V-belt 73 drivingly engaged with that pulley and the lower wheel pulley 56 mounted on the lower wheel axle 54. The spring 69 is compressed by turning the castellated nut 68 downwardly and its expansive force acts to apply force to the V-belt 73 to maintain the belt 73 in proper driving tension.

The lower saw wheel 10 is removably mounted on the end of the axle 54, the axle having a beveled portion 74 near its end and a threaded portion 75 at its end. The lower wheel 10 has a hub 76 which also is beveled to fit on the beveled portion 74 of the axle 54 and the axle 54 is provided with a Woodruff key 77 engageable in a keyway 78 milled in the beveled interior of the hub 76. The wheel 10 is retained on the axle 54 by a hand nut 79 engageable with the threaded portion 75 of the axle 54. The hand nut 79 is removably attached to the hub 76 by means of a flat split ring 80 held on its inner surface by screws 81 (Figure VIII), which is engaged in an annular groove 82 cut in the exterior of the hub 76. Thus, when the hand nut 79 is rotated with respect to the axle 54 the lower wheel 10 is pulled off the end of the axle 54 by the split ring 80.

A pan shaped closure 83 is mounted on the right end of the journal housing 40 behind the lower wheel 10 and a rubber ring 84 is cemented to its outer edge. The closure 83 and rubber ring 84 close the vertically elongated aperture 28 in the inside wall 27 of the wheel compartment 21.

The left side of the base housing 1 is closed by a removable sheet metal panel 85 which is so formed as to have approximately the same shape as the access door 17, being located on the side of the base housing opposite to the access door 17. A scrap pan 86 is removably located in the wheel compartment 21 and has a segmental cutout space 87 in its rear wall so that it can be slid to the inside of the compartment 21 beneath the lower wheel 10 to catch drippings of fat and scraps and bits of meat which may be thrown off the wheel or the blade during operation. The base housing 1 is supported on the four hollow formed metal legs 2 a slight distance above the floor level thus permitting access to the area beneath the machine for sweeping to prevent any vermin from breeding beneath the machine.

*Operation of blade tensioning device*

The lower saw wheel and motor supporting mechanism above described functions not only for those purposes but also to permit tension to be applied to the saw blade 11. The saw blade 11 runs on the lower saw wheel 10 and the upper saw wheel 9 and must be kept taut during operation of the machine both to maintain it in true running position on the peripheries of the saw wheels and also to prevent its being kinked or twisted when heavy pieces of meat or bone are pressed against its cutting edge during the cutting operations. The periphery of the saw wheel 10 has a flange 88 at its rear edge and a bevel 89 at its forward edge. The bevel is provided to accommodate the teeth of the saw, which are "set" slightly in common with saws used for other purposes. The flange 88 at the rear of the wheel periphery prevents the saw from being run off the wheel when pressure is exerted against it during a cutting operation.

The upper saw wheel 9, as will be later described, is journaled in the head of the machine so that its axle can be tilted to make it run true, but during operation its axle remains stationary and it is not translatable. Therefore, in order to apply the proper tension to the saw blade 11 and also to accommodate blades of slightly different lengths as, for example, when a blade has been broken and rewelded, the lower saw wheel and its axle are supported as above described so that they can be moved vertically. Mere ability to be moved, however, is insufficient because in order for the saw blade to operate properly it must be under a certain predetermined tension regardless of its length.

The mechanism described above is so designed that the weight of the driving motor, which is substantial, is employed to apply the majority of the tensioning force to the blade and thus eliminating the necessity for applying all the force manually. Merely connecting the motor directly to the lower saw wheel journal mounting alone would not, however, properly solve the tension problem because this weight is not variable as is required by changes in length of the blade and does not apply a predetermined resilient tensioning force which allows a small degree of variance in the proper tension on the blade when the machine is operating.

In the present invention this resilience in the tensioning force is achieved by applying to the lower wheel supporting mechanism the resilient force of a spring which is so mounted that its loading and, consequently, its active force can be manually varied as required by blades of different lengths so that regardless of the length of the blade a predetermined tensioning force can be applied at will. This force is applied and its application directly indicated by the linkage means above described. When the blade 11 is in position around the upper saw wheel 9 and the lower saw wheel 10, the weight of the motor 12 pulling downwardly on the casting 40 tends to swing the bell crank comprising the rocker arms 34 and 35 and the shaft 30 in a clockwise direction (Figure IV). This force also tends to pull inwardly on the control rod 42 but is of insufficient magnitude to stretch the blade 11 sufficiently to place it under proper operating tension. In order to apply the additional increment of force the hand crank 44 is rotated in a counterclockwise direction which moves the nut 41 outwardly on the threaded portion of the rod 42, swinging the bell crank linkage further in a clockwise direction and further lowering the journal casting 40, to stretch the saw blade 11. The reaction of this rotation of the hand crank 44 forces the control rod 42 to the right in Figure IV compressing, or loading, the coil spring 46 which surrounds the rod 42. When the hand crank 44 has been rotated sufficiently so that the forces, consisting of the loading of the coil spring 46 plus the weight of the motor 12, are counterbalanced by the tension placed on the saw blade 11, the control rod 42 has been moved to the right (in Figure IV) a distance sufficient to bring a mark 90 scribed on the periphery of the hub of the hand crank 44 into registration with a notch 91 cut on the flat upper surface of the milled off outer end of the bushing 43. At this point the inner end of the hub of the hand crank 44 has moved outwardly away from a shoulder 92 (on the bushing 43) which was formed when the upper portion of the bushing was milled off to provide the flat surface in which the notch 91 is cut. By proper selection of the strength of the spring 46 it is thus possible to provide a tensioning mechanism which will apply a predetermined resilient tension to a blade mounted in the machine regardless of the particular length of the blade.

When it is desired to remove or replace a saw blade the hand crank 44 is rotated in a clockwise direction which relieves the loading of the spring 46 and moves the control rod 42 to the left in Figure IV, until the inner end of the hub of the hand crank 44 engages the shoulder 92 on the bushing 43. Further rotation of the hand crank 44 in a clockwise direction moves the nut 41 to the right, swinging the bell crank comprising the rocker arms 34 and 35 in a counterclockwise direction and lifting the journal casting 40 and motor 12 vertically to completely free the blade 11 from any tension so that it can be removed from the machine.

*Upper housing*

The upper housing of the machine consists of the column 7 which is erected at the rear center portion of the base housing 1 and the head 8 formed at the top of the column 7. The column 7 (Figures XI and XIX) is substantially H-shaped in horizontal cross section, the two arms of the H forming the front and rear walls 93 and 94 of the column and the cross bar forming a web 95 extending from front to rear between the walls 93 and 94. The column 7 is mounted on the base housing 1 by four main studs 96 and 97. The two studs 96 extend horizontally through a formed bracket 98 located at the rear of the column which extends down behind the rear edge of the main table casting 16 and are threaded into the rear edge of the table casting 16. The two studs 97 extend downwardly through a pair of pads 99 which are formed at the lower ends of the rear wall 94 and front wall 93 of the column 7 said studs being threaded into the upper surface of the main table casting 16.

The column 7 is integral with the main frame of the head 8, the front wall 93 of the column 7 continuing upwardly and around the underside of the head 8 and the rear wall 94 of the column 7 continuing upwardly and over, the two walls joining to form a somewhat circular periphery for the head 8 with the web 95 continuing upwardly to form a center wall 100 (Figure XII) for the head 8. The head 8 and column 7 thus are divided into two vertically separated shallow compartments 101 and 102 with the web 95 and wall 100 separating the two compartments. The right side of the compartment 101 is closed by a door 103 which is hinged at its rear edge by hinges 104 to the right edge of the rear wall 94 of the column 7. The door 103 completely encloses the compartment 101 and all mechanism contained therein. The door 103 is provided with a hand knob 105 (Figure III) and a latch consisting of a bent spring 106 and button 107 with which it engages, the button 107 being studded into the front wall 93 of the head 8 near its lower front corner. In the drawings the door 103 is shown as a single casting with decorative contours formed on its outer surface. The opposite side of the head 8 is formed by a panel 108 which closes the left compartment 102 and has an exterior contour similar to that of the door 103 in order to provide a pleasing symmetrical design. The panel 108 is held in place by a plurality of retaining bolts 109 which extend through the center wall 100 and are threaded into a thickened flange 110 formed at the edges of the panel 108. This construction lends great strength to the column and head of the machine since it is, in effect, an I-beam opposing its cantilever strength against the tension of the saw blade 11, which tension tends to bend the column 7 forwardly or the front end of the head 8 downwardly.

The upper saw wheel 9 is mounted on an axle 111 which is rotatably journaled in a pair of roller bearings 112 in turn mounted in a tubular casting 113. The casting 113 extends through a central aperture 114 in the wall 100 and is provided with three ears 115 extending radially from its sides and top. The tubular casting 113 also has a pair of laterally spaced downwardly extending bosses 116. See Fig. XIII. The casting 113 is adjustably mounted on the wall 100 by means of three bushings 117 which are threaded on their outer surfaces and bored at their center to receive studs 118. The bushings 117 are threaded through the ears 115 and their innermost ends bear directly on the surface of the wall 100. Lock nuts 119 are threaded on the outer ends of the bushings 117 which also are provided with transverse slots 120 for the reception of a bifurcated screw driver. A stud 121 is threaded into each of the bosses 116 with its head 122 resting on a horizontal pad 123 formed on the wall 100.

The position of the axle 111 thus can be adjusted angularly with respect to the position of the lower wheel axle 54 to bring it into exact parallelism therewith in order that the two saw wheels 9 and 10 run in exactly the same vertical plane. This adjustment of the axle 111 is accomplished by loosening the locking nuts 119, moving the bushings 117 relative to their ears 115 and when in the proper adjusted position tightening the studs 118 to lock the casting 113 in position and retightening the locking nuts 119 to prevent movement. The studs 121 also can be adjusted relative to the bosses 116 in which they are threaded to properly position the casting 113. The studs 121 also bear considerable of the downward thrust caused by the tension of the blade 11.

The end of the casting 113 and the adjustable mounting means which all are located in the compartment 101 are enclosed by a pan shaped cover 124 which has a centrally located hole 125 and a rim 126 that is clamped by bolts 127 against an annular gasket 128. The right end of the axle 111 which extends through the hole 125 into the compartment 101 has a beveled portion 129 near its end and its outermost end 130 is threaded. The upper saw wheel 9 has a hub 131 which also is beveled and slotted for the reception of a Woodruff key 132. The upper wheel 9 is retained on the axle 111 by a hand nut 133 screwed onto the threaded end 130 of the axle 111. The hand nut 133 is retained on the hub 131 by a split ring 134 which is engaged in an annular recess 135 cut in the exterior of the hub 131, the split ring 134 being secured to the hand nut 133 by bolts 136.

The periphery of the upper wheel 9 has a flange 137 at its rear edge and a bevel 138 at its front edge to guide the saw 11 and accommodate its set teeth in the same manner as the lower wheel 10 is constructed. The saw blade 11 passes around the upper wheel 9 down through an opening 139 formed at the lower front corner of the wall 93 of the head 8, across the throat of the machine between the lower portion of the head 8 and the top of the table 6, through an aperture 140 in the table 6, around the lower saw wheel 10 and up through a space 141 in the table casting 16 into the interior of the compartment 101 in the column 7 and, in the head 8, back onto the upper wheel 9. See Fig. XI.

*Saw guard*

The span of the blade 11 which crosses the open throat of the machine is dangerous because the saw moves at an extremely high speed during operation. It is desirable therefore that only that portion of the saw actually required to pass through the particular piece of meat being cut should be exposed because of the possibility that the operator's hand or arm may be injured by contacting the saw blade above the meat being cut. In order to guard that portion of the blade not required and also in order to provide backing means for the blade as close to the meat being cut as possible, the machine is equipped with a saw guard and upper guide 142 (Figures XI and XV through XVIII). The saw guard and upper guide 142 is mounted to slide vertically by means of a square rod 143 which extends upwardly through the interior of a switch plate casting 144 mounted on the front of the head 8 and secured to the front wall 93 by means of studs 145. The casting 144 has square slots 146 milled through its upper and lower walls which are in vertical alignment and which lead into an opening 147 formed in the casting 144. The rod 143 slides in the slots 146 through the opening 147. The rod 143 is retained in any vertical position to which it is moved by sliding engagement with a friction block 148 which is urged against its side by a pair of small coil springs 149 acting between a vertical web 150 of the casting 144 and the friction block 148. The square slide rod 143 is prevented from moving downwardly too far by a stop stud 151 (Figure XI) which is set in one side of the rod 143 near its upper end and which engages the top of the switch plate casting 144 when the guard 142 is moved downwardly to the limit of its travel.

The saw guard itself consists of a vertically extending U-shaped channel member 152 which extends upwardly through the opening 139 in the front wall 93. One arm of the channel shaped guard 152 terminates in a rod 153. At the lower end of the rod 153 is cut a horizontally extending key shaped lug 154 which is insertable through a keyhole shaped slot 155 cut in a horizontal arm 156 of a saw guard bracket 157 mounted on the lower end of the rod 143. The bracket 157 has a downwardly extending arm 158 which is secured to the flat side of the rod 143 by a pair of screws 159 (Figures XI and XVIII). The saw guard 152 can be removed from its position on the bracket 157 by rotating it 90° (in a clockwise direction, Figure XVIII) to bring the lug 154 into registration with the keyhole 155, permitting the guard 152 to be lifted slightly with respect to the bracket 157, to withdraw the lug 154 through the keyhole 155. At the upper end of the guard 152 the rod 153 extends above the channel shaped portion of the guard (see Figure XVII) and when the guard is moved to the upper limit of its travel the end of the rod 153 enters a conical notch 160 (Figures XI and XVII) formed in a small ear 161 cast on the center wall 100.

At the lower end of the rod 143 there also is mounted an upper saw guide 162 (Figures XI, XVII and XVIII). The upper saw guide 162 consists of a body 163 having a handle 164 at its front end and a pair of transversely extending bosses 165 and 166 at its rear end. The body 163 is mounted on the lower end of the square rod 143 by means of a pair of flat headed screws 167 (Figure XVIII) which pass through the rod 143 and are threaded into the handle portion of the body 163. The boss 166 removably mounts a guide bearing 168 which has a vertical slot 169 closely embracing the rear portion of the saw blade 11. The guide bearing 168 is held in place in the boss 166 by a screw 170 threaded through the back of the boss 166 and into the end of the guide bearing 168.

The boss 165 adjustably mounts a thrust bearing 171 which comprises a hardened cup-shaped cover 172 mounted on the outer race of a ball bearing 173, the inner race of which is fixed on the forward end of a tenoned shaft 174. The shaft 174 extends to the rear of the boss 165 and has a short rod 175 threaded in its rearmost end. The outer end of the short rod 175 extends beyond the end of the boss 165 and a knurled thumb nut 176 is pinned thereon. By rotating the thumb nut 176 the horizontal position of the thrust bearing 171 can be adjusted so as to properly back up the saw blade 11. During normal operation of the machine the saw blade 11 slightly clears the hardened cover 172 of the thrust bearing 171 and only engages such bearing when cutting pressure is exerted against the blade 11.

By means of the handle 164 the combination guide and guard 142 can be lowered or elevated as the need may be to accommodate chunks of meat being cut. This insures that the blade is backed up and guided immediately above the piece of meat being cut and also that the saw blade, where not required to pass through the meat, is guarded to prevent accidental injury to an operator.

*Lower saw guide*

In order to properly guide the saw blade 11 beneath the piece of meat being cut and to prevent any damaging engagement between the teeth or other portions of the blade and the table 6, where the blade passes through the aperture 140 in the table 6, there is provided beneath the surface of the table 6 and removably mounted on the main table casting 16, an adjustable lower saw guide 177 (Figures VIII and IX). The lower saw guide assembly consists of a bifurcated guide bearing 178 and a thrust ball bearing 179 substantially identical with the corresponding parts 168 and 171 of the upper saw guide. The guide bearing 178 and thrust bearing 179 are mounted in a mounting bracket 180 which is secured on the ends of two horizontally extending rods 181. The rods 181 extend through a guide block 182 and are attached to a yoke 183. The guide block 182 is removably mounted on the inner surface of the front web of the main table casting 16, being positioned by two inwardly extending pins 184 which are studded in the web of the casting 16 and held thereon by a threaded rod 185, the outer end of which extends through and beyond the front web of the table 16 and to which is attached a knurled thumb nut 186. A second thumb nut 187 (Figure IX) is pinned on the end of a short shaft 188 which passes through the yoke 183 and is threaded into the guide block 182. The guide bearing 178 is held in the mounting bracket 180 by a screw 189 and the thrust bearing 179 is rotatably mounted on a stud 190 held in place in the mounting bracket 180 by a C clip 191. The guide bearing 178 also is utilized for mounting a pair of thin flexible bladed scrapers 192, the lower ends of which are attached to the sides of the guide bearing 178 and the upper ends of which are bent inwardly to scrape opposite sides of the blade 11 above the guide bearing 178.

By unscrewing the thumb nut 186 the guide block 182 can be pulled off the two positioning pins 184 and the entire guide assembly comprising the guide bearing 178, thrust bearing 179 and bladed scrapers 192 removed as a unit from the machine. When the guide assembly is in place the clearance between the thrust bearing 179 and the saw blade 11 can be adjusted by rotating the thumb nut 187 and sliding the entire guide mounting bracket 180 longitudinally, the rods 181 sliding through the guide block 182.

Wheel scrapers

The two blade scrapers 192 described above remove a considerable portion of the grease and fatty matter which adheres to the blade 11 after it passes through the meat, but they cannot be made to grasp the blade tightly enough to remove all of the fat and grease which adheres to it and a considerable quantity of this material is transferred to the peripheries of the upper and lower saw wheels 9 and 10. It is necessary therefore to provide an upper wheel scraper 193 (Figure XI) and a lower wheel scraper 194 (Figures VIII and X) for the purpose of removing accumulated grease from the peripheries of the wheels to reduce the tendency for the blade to slip on the wheels and to aid in keeping the machine clean. The lower scraper 194 consists of a formed metal bracekt 195 which is pivotally mounted on a stud 196 riveted in an ear 197 welded or otherwise secured on the undersurface of a member of the table 6. The other end of the bracket 195 carries a scraper blade 198 the lower end of which rides on the periphery of the lower saw wheel 10. The bracket 195 is urged downwardly by a spring 199 which is coiled around a stud 200 also riveted in the ear 197, one arm of the spring 199 being hooked beneath the stud 196 and the other arm hooked over the bracket 195.

The upper wheel scraper 193 is similarly enstructed having a bracket 201 pivotally mounted on a stud 202 threaded into the center wall 100 of the head 8 and a scraper blade 203 which is urged upwardly against the periphery of the upper wheel 9 by a coiled spring 204 wrapped around a stud 205 threaded into the wall 100, the arms of the spring 204 being hooked above the stud 202 and beneath the bracket 201 respectively.

Stationary table

The machine is provided with a stationary working table generally numbered 6 which overlies the upper surface of the main table casting 16 forming a flat top on the base housing 1. The table 6 actually consists of three separate parts. These are a removable table section 206 (Figures XIX and XX) a column base 207 and a stationary table plate 208. The column base 207, which consists merely of a flat substantially square plate, is set on ribs formed on the upper surface of the main table casting 16 and held in place between the casting 16 and the bottom of the column 7 by the studs 97 which secure the column to the main table casting and the base. The stationary table plate or section 208 consists of a sheet of metal, preferably stainless steel or other smooth durably finished material, which overlies the left half (the "upper half" in Figure XIX) of the base housing 1 and table casting 16, resting on a plurality of ribs 209 (Figures IV and XX) formed on the upper surface of the table casting 16 and on a pair of outriggers 210 (Figures IV and XIX) which are bolted to the left edge of the table casting 16. The plate 208 is secured to the table 16 and horizontal arms of the outriggers 210 by several studs 211 which are welded to the underside of the table plate 208 and held in place on the casting 16 or outriggers 210 by nuts and washers 212 and 213 threaded on their lower ends. The stationary table plate 208 is provided with several laterally extending tongues 214 which are welded to the underside of the plate 208 extending to the right slightly beyond the edge of the plate 208.

Similar tongues 215 are welded to the inner edge of the removable table 206 which rests on ribs 216 formed around the edges of the right half of the upper portion of the table casting 16. The removable table plate 206 overlies an opening 217 formed in the table casting 16 through which access can be gained to the lower guide and scraper unit 177 when the table plate 206 is removed. The plate 206 is properly positioned by means of a positioning stud 218 (Figures IV and XX) riveted to its underside which engages a hole 219 bored in a horizontal web-like portion near the right end of the table casting 16. Because the removable table plate 206 must be tilted in order to disengage the stud 218 from the hole 219 the door 103 of the column and head (Figure IV) is beveled at its lower edge to permit the table to be tipped upwardly and to the left. The aperture 140 through which the saw blade 11 returns to the base actually is formed by notches cut in the front center corners of the two table sections 206 and this aperture is closed by a formed bracket 220 (Figures XI and XIX) mounted on the upper surface of the table casting 16 adjacent the front edges of the two table sections 206 and 208.

Moving table

In order to support the main piece of meat from which steaks, roasts and other pieces are being cut in such a manner as to enable it to be moved past the saw blade 11, the machine is provided with a moving table 5 (Figures I, XIX and XXI). The moving table 5 consists of a plate 221 which is welded upon a plurality of inverted channel shaped cross members 222 which extend between two main angle bars 223. The table is secured on the two angle bars 223 by several studs 224, the heads of which are welded to the undersurface of the plate 221 and extend through holes bored through the horizontal angle bars 223. The table 5 travels across the machine on a pair of tracks 225, one located at the front and one at the rear of the two table brackets 3 which are bolted to the front outside wall of the base housing 1, the bolts passing through certain of the angle irons forming the main structural framework of the base housing. Each of the tracks 225 consists of an angle iron 226 having an outwardly extending arm 227 forming the track and an inwardly extending upper arm 228 which rests on the tops of bosses 229 formed on the brackets 3 and a retaining plate 230 which consists of a flat plate overlying the upper inwardly extending arm 228 of the track 226 and secured with the track 225 to the bosses 229 by screws 231.

The table 5 rides on six wheels formed by ball bearings 232 which are mounted on studs 233 riveted into the vertical arms of the angle bars 223. Travel of the table from the position shown in solid lines in Figure XIX to the position shown in dotted lines in Figure XIX permits a full sweep of any meat carried on the table past the blade 11. Travel of the table on its track is limited by a stationary stop 234 near the right end of the track and by a movable stop 235 near the left end of the track. The stop 235 is pivotally mounted so that when desired it can be swung to the position shown by the dotted lines in Figure XXI to permit the table to be removed. The rear edge of the plate 221 overlies the top front edge of the table casting 16 extending to within a small fraction of an inch of the front edges of the stationary table plate 208 and the removable table plate 206.

The trailing edge of the table 5 is turned upwardly forming a flange 236 which serves as a transverse guide for the pusher plate 15. The pusher plate 15 has a flat vertical face 237 (Fig. XIX) turned rearwardly toward the back of the table and a handle 238 which slidingly embraces the flange 236. The pusher plate 15 is used to hold smaller pieces of meat in place while cutting and, in particular, is useful when employed in conjunction with the thickness gauge plate 14 as, for example, in cutting steaks, to enable the last steak to be held in place without danger to the operator's fingers.

Thickness gauge plate

In order to enable the cutting of pieces of meat such as steaks and chops in uniform thickness the machine is equipped with the thickness gauge plate 14 which is adjustable back of the cutting plane of the blade any selected distance up to a predetermined maximum (four inches shown in the drawings). The thickness gauge plate 14 consists of a vertical plate 239 (Figures I, II, XIX and XXIII to XXV) which extends upwardly and to the left from a tubular slide 240 slidably mounted upon a guide rod 241 which extends from the front to the rear of the machine parallel and adjacent to the right edge of the table 206. The rod 241 is mounted in a pair of downwardly turned arms 242 which are cast integrally with the main table casting 16 and extend to the right some distance beyond the edge of the table 206. The slide 240 has a downwardly extending finger 243 which is engageable behind a lug 244 formed on the side and at the rear of an elongated nut 245 which is threaded on a shaft 246 rotatably mounted in the arms 242 parallel to and slightly outside and below the guide rod 241. The nut 245 has an upwardly extending arm 247 which also is slidably mounted on the guide rod 241 and which, when the finger 243 is engaged behind the lug 244, engages the front end of the slide 240. The shaft 246 extends through the front one of the arms 242 where it is connected by means of a coupling 248 to a second shaft 249 which extends forwardly beneath the framework for the movable table 5 and is supported near its front end by a sheet metal support 250 secured to the front one of the angle irons 226. A hand crank 251 is pinned on the front end of the shaft 249. When the hand crank 251 is rotated it rotates the shaft 246 and this in turn shifts the elongated nut 245. With the gauge plate slide 240 engaged between the lug 244 and the arm 247 of the nut 245 the gauge plate 14 also is shifted. Thus, by rotating the hand crank 251 the position of the thickness gauge plate 14 can be selectively varied at will relative to the cutting plane of the blade 11.

When it is desired to cut up large pieces of meat and, therefore, the gauge plate 14 must be transplaced to the rear of the machine to clear the throat so that the large piece of meat can be moved therethrough, the gauge plate can be operatively disconnected from the nut 245 by tilting it bodily in a clockwise direction (from the front of the machine as shown in Figure II) or outwardly as shown in Figure XXIV to disengage the finger 243 from back of the lug 244. The gauge plate 14 can then be slid the length of the guide rod 241 to the rear of the machine. Because the gauge plate must extend to the left up to the blade 11 in order to properly support meat being cut in relatively thin slices, it is so long that if it were slid in non-tilted position to the rear of the machine, its left end would strike the side of the column 7. Therefore, a fender 252 (Figures IV, XIX and XXIII) is provided near the rear of the machine, the fender being formed integrally with the table casting 16 and the arm 242 as a horizontal shelf. The fender 252 extends to the right a sufficient distance so that (as can best be seen in Figure IV) the lower right-hand corner of the plate 239 between the guide rod 241 and the edge of the table 206, engages the fender 252 before the plate 239 would strike the column 7. The front edge of the fender 252 is mitered (Figure XIX) and it therefore cams the gauge plate 14 up and out swinging the plate 239 out of line to strike the column 7.

If the thickness gauge plate 14 has been employed to cut steaks, for example, of certain thickness and it then becomes necessary to slide the gauge plate out of the way so that larger chunks of meat can be separated, the gauge plate need only be rocked outwardly to disengage it from the control nut 245 and slid directly to the rear of the machine. If it is then desired to return the gauge plate to the same position at which it was located before being removed, it can be merely slid forward until the front end of the slide 240 engages the arm 247 on the nut 245 and then swung downwardly to its operative position. This returns the gauge plate to the same position back of the saw blade as it was before being moved without requiring tedious adjustment of the position of the nut 245 by the hand crank 251.

*Miscellaneous*

The machine embodying the invention is equipped with a starting switch 253 which is located in a most accessible position, being mounted by means of the switch plate 144 at the front part of the head 8 (Figures XV and XVI). The switch 253 has a control toggle 254 which extends through a small opening in the front wall of the switch casting 144.

Because machines of this general type usually are backed up against a wall when placed in position in an establishment where they are employed in order to consume as little space as possible and, in particular, because the machine embodying the instant invention can be backed up tightly against the wall since it has no controls at the back of the machine (for example, the tensioning mechanism is located in the base and the hand crank at the side of the machine), light usually comes from behind an operator. This means that in meat cutting band saws constructed in accordance with the teachings of the prior art the operator's shadow is cast down upon the blade and upon the face of the meat which is being cut. The machine embodying the instant invention is, therefore, provided with a work light 255 (Figures XII and XIV) which is located in a recess 256 formed by the lower front wall 93 of the head 8 and the lower edge of the left panel 108. By recessing the work light 255 in the head it is protected from accidental damage by being struck by a large piece of meat being moved through the throat of the machine or by accidental engagement with the arm of the operator. By locating the light on the side of the blade opposite that on which the operator stands and beneath the head 8 no shadow is cast either upon the swiftly moving, dangerous blade or the meat being cut. The work light 255 is wired parallel with the motor 12 so that as soon as the machine is started the light is turned on to brightly illuminate the work and the blade, thus also serving as a warning that the blade is running.

The location of the blade tensioning device completely within the base housing eliminates the necessity for any operative mechanical linkages or connections between the base housing 1 and the head 8. This permits the machine to be constructed as above-described so that the head 8 is a unit complete within itself and merely is mounted on the base housing 1 to serve as a support for the upper saw wheel 9 and for the parts carried by the head which cooperate with the saw blade 11 and the saw wheel 9. For ease in packing, shipping and carrying a meat saw embodying the invention, the machine easily can be divided into two separate units, i. e., the base housing with its enclosed and associated parts and the head. Thus, for example, a demonstrator can transport a saw embodying the invention in two major pieces, assembling the machine after it has been carried to the place where the demonstration is to be held. The blade 11 is inserted into the machine after the head has been mounted on top of the base with ease by opening the door 103 and removing the removable table section 206 to give access to the upper and lower saw wheels around which the blade must be placed.

Similarly, the brackets 3 which support the movable table 5 and the outriggers 210 which support the end of the stationary table section 208, can be quickly detached and assembled on the base housing 1 to simplify packing and transportation of the machine.

The provision of a flat relatively unobstructed center wall 100 in the column 7 and head 8 and the enclosing of the lower wheel compartment 21 isolates those portions of the head and base which are likely to be splattered with bits of meat and fat thrown off the saw or upper and lower wheels during operation. This isolation of the dirt receiving portions of the machine simplifies substantially the maintaining of the machine in sanitary condition because, upon removal of the blade, the upper and lower wheels, the wheel scrapers and the lower saw guide unit, the entire surface of the machine which is likely to become dirty is exposed for easy cleaning and is so sealed from the remainder of the machine that it even can be hosed down with a hot water or steam hose.

The embodiment of the invention which has been described may be modified to meet various requirements.

Having described the invention, we claim:

1. In a meat cutting band saw, in combination, a base housing, an upper housing erected thereon, an upper saw wheel journaled in said upper housing, a vertically movable frame in said base housing, a lower saw wheel journaled in said frame, a continuous band saw blade running on said saw wheels, a motor drivingly connected to said lower wheel and supported on said vertically movable frame, the weight of said motor acting to apply tension on said blade and manually adjustable means for augmenting the tension applied by the weight of said motor to said blade.

2. In a meat cutting band saw, in combination, a base housing, a column erected on said base, a head atop said column, an upper saw wheel journaled in said head, a lower saw wheel journaled in said base housing, a continuous band saw running on said wheels, vertically movable mounting means for journaling said lower saw wheel, a drive motor supported on said mounting means, spring urged linkage mounted in said base housing for augmenting the action of the weight of said motor, and manually adjustable means for varying the force of said spring.

3. In a meat cutting band saw, in combination, a base housing, a column erected on said base, a head atop said column, an upper saw wheel journaled in said head, a lower saw wheel journaled in said base housing, a continuous band saw running on said wheels, vertically movable mounting means for journaling said lower saw wheel, a drive motor supported on said mounting means, linkage mounted in said base housing for supporting said mounting means, a spring mounted to urge said mounting means downwardly and manually adjustable means for varying the force of said spring.

4. Blade tensioning means for a band saw having a pair of vertically spaced saw wheels and a saw blade running thereon, the upper one of said saw wheels being non-translatably mounted comprising, in combination, a vertically movable lower wheel journal frame, said lower wheel being journaled in said frame, a drive motor supported from said frame, linkage for moving said frame vertically, a spring connected to said linkage for urging said frame downwardly and manually operable means for loading said spring with predetermined force.

WALTER A. FINK.
JAMES D. BROWN.

REFERENCES CITED

The following references are of record in the file of this patent:

UNITED STATES PATENTS

| Number | Name | Date |
|---|---|---|
| 177,622 | Cordesman | May 23, 1876 |
| 544,694 | Shaw | Aug. 20, 1895 |
| 730,419 | Tweedie | June 9, 1903 |
| 1,152,696 | Berry | Sept. 7, 1915 |
| 1,258,517 | Woods et al. | Mar. 5, 1918 |
| 1,392,990 | Vaughan | Oct. 11, 1921 |
| 1,427,661 | Walker | Aug. 29, 1922 |
| 1,511,788 | Vaughan | Oct. 14, 1924 |
| 1,580,407 | Carlson | Apr. 13, 1926 |
| 1,643,829 | Biro | Sept. 27, 1927 |
| 1,841,939 | Dekonine et al. | Jan. 19, 1932 |
| 1,863,822 | Avilla | June 21, 1932 |
| 1,870,774 | Gaines | Aug. 9, 1932 |
| 1,967,724 | Ponton | July 24, 1934 |
| 2,007,458 | Ponton | July 9, 1935 |
| 2,048,629 | Wallin | July 21, 1936 |
| 2,081,033 | Biro | May 18, 1937 |
| 2,169,517 | Biro | Aug. 15, 1939 |
| 2,274,923 | Hedgpeth | Mar. 3, 1942 |
| 2,311,268 | Tannewitz | Feb. 16, 1943 |
| 2,347,765 | Boice et al. | May 2, 1944 |
| 2,380,700 | Lasar | July 31, 1945 |
| 2,423,363 | Biro | July 1, 1947 |
| 2,492,824 | Ahrndt | Dec. 27, 1949 |

FOREIGN PATENTS

| Number | Country | Date |
|---|---|---|
| 260,286 | Italy | Sept. 13, 1928 |
| 163,071 | Switzerland | Sept. 16, 1933 |